(12) United States Patent
Chen et al.

(10) Patent No.: US 12,499,967 B2
(45) Date of Patent: Dec. 16, 2025

(54) ROW REPAIR CIRCUITRY

(71) Applicant: Arm Limited, Cambridge (GB)

(72) Inventors: Andy Wangkun Chen, Austin, TX (US); Khushal Gelda, Jaipur (IN); Ramesh Manohar, Bangalore (IN); Teresa Louise McLaurin, Dripping Springs, TX (US); Prashant Mohan Kulkarni, Cambridge (GB)

(73) Assignee: Arm Limited, Cambridge (GB)

( * ) Notice: Subject to any disclaimer, the term of this patent is extended or adjusted under 35 U.S.C. 154(b) by 167 days.

(21) Appl. No.: 18/243,441

(22) Filed: Sep. 7, 2023

(65) Prior Publication Data

US 2025/0087296 A1    Mar. 13, 2025

(51) Int. Cl.
*G11C 29/18*    (2006.01)
*G11C 29/00*    (2006.01)
*G11C 29/44*    (2006.01)

(52) U.S. Cl.
CPC ............ *G11C 29/785* (2013.01); *G11C 29/18* (2013.01); *G11C 29/44* (2013.01)

(58) Field of Classification Search
CPC ....... G11C 29/785; G11C 29/18; G11C 29/44; G11C 29/848; G11C 29/81; G11C 29/781; G11C 29/808
See application file for complete search history.

(56) References Cited

U.S. PATENT DOCUMENTS

| | | | |
|---|---|---|---|
| 9,911,510 B1* | 3/2018 | Kwon | G11C 29/76 |
| 2001/0009521 A1 | 7/2001 | Hidaka | |
| 2008/0266990 A1* | 10/2008 | Loeffler | G11C 29/808 |
| | | | 365/201 |
| 2022/0319632 A1 | 10/2022 | Kaur et al. | |

OTHER PUBLICATIONS

PCT International Search Report and Written Opinion; PCT/GB2024/050584; Jun. 1, 20244.

* cited by examiner

*Primary Examiner* — Mohammed A Bashar
(74) *Attorney, Agent, or Firm* — Pramudji Law Group PLLC; Ari Pramudji (57) ABSTRACT

Various implementations described herein are directed to a device having a bank of bitcells split into a plurality of portions including a first row slice of the bitcells and a second row slice of the bitcells. Also, the device may have control circuitry configured to access and repair a first bitcell in the first row slice with a first row address and a second bitcell in the second row slice with a second row address that is different than the first row address.

20 Claims, 6 Drawing Sheets

Row Repair Control 204

| Name | Type | Description |
|---|---|---|
| RRE0 | Input | Row Redundancy Enable for Row-Slice_0 |
| RRE1 | Input | Row Redundancy Enable for Row-Slice_1 |
| FRA0[x-1:0] | Input | Faulty Row Address for Row-Slice_0 |
| FRA1[x-1:0] | Input | Faulty Row Address for Row-Slice_1 |

Row Repair Control 404

| Name | Type | Description |
| --- | --- | --- |
| RRE0 | Input | Row Redundancy Enable for Row-Slice_0 |
| RRE1 | Input | Row Redundancy Enable for Row-Slice_1 |
| RRE2 | Input | Row Redundancy Enable for Row-Slice_2 |
| RRE3 | Input | Row Redundancy Enable for Row-Slice_3 |
| FRA0[x-1:0] | Input | Faulty Row Address for Row-Slice_0 |
| FRA1[x-1:0] | Input | Faulty Row Address for Row-Slice_1 |
| FRA2[x-1:0] | Input | Faulty Row Address for Row-Slice_2 |
| FRA3[x-1:0] | Input | Faulty Row Address for Row-Slice_3 |
| LREN[0] | Input | Control Access Enable for Bank_0 |
| LREN[1] | Input | Control Access Enable for Bank_1 |

ROW REPAIR CIRCUITRY

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some modern circuit architectures, row repair for memory cells is deficient in some memory based applications and designs. For instance, some row repair schemes and techniques either disable all row repair functionality or use row repair on only a portion of memory cells in memory instances. In some other instances, some row repair schemes and techniques cut and/or remove portions of memory cells in memory instances so that row repair is only applied to a reduced portion of memory cells in memory instances. Also, these conventional row repair schemes and techniques may suffer from area and power penalties due to smaller memory instances. As such, there exists a need for more efficient row repair schemes and techniques that reduce conventional memory inefficiencies by providing more effective row repair designs for memory based applications.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to row repair schemes and techniques for various memory related applications in physical designs. Also, in some implementations, various row repair schemes and techniques described herein provide for novel row redundancy applications in memory based circuit designs. For instance, in some implementations, a bank of bitcells may be split into a plurality of portions including a first row slice of the bitcells and a second row slice of the bitcells, and control circuitry may be configured to access and repair a first bitcell in the first row slice with a first row address and a second bitcell in the second row slice with a second row address that is different than the first row address. Also, in some implementations, a first bank may have first bitcells partitioned into a plurality of portions including, e.g., a first row slice of the first bitcells and a second row slice of the first bitcells, and a second bank may have second bitcells partitioned into another plurality of portions including a third row slice of the second bitcells and a fourth row slice of the second bitcells, and, in this instance, control circuitry may be configured to access and repair two different first bitcells in the first bank with a first pair of different addresses and two different second bitcells in the second bank with a second pair of different addresses. Thus, in various applications, the plurality of portions may include two portions or four portions; however, any number of portions may be used to implement row repair schemes and techniques described herein.

Various implementations of row repair schemes and techniques for memory based applications will now be described herein in FIGS. 1-6.

Figure 1:
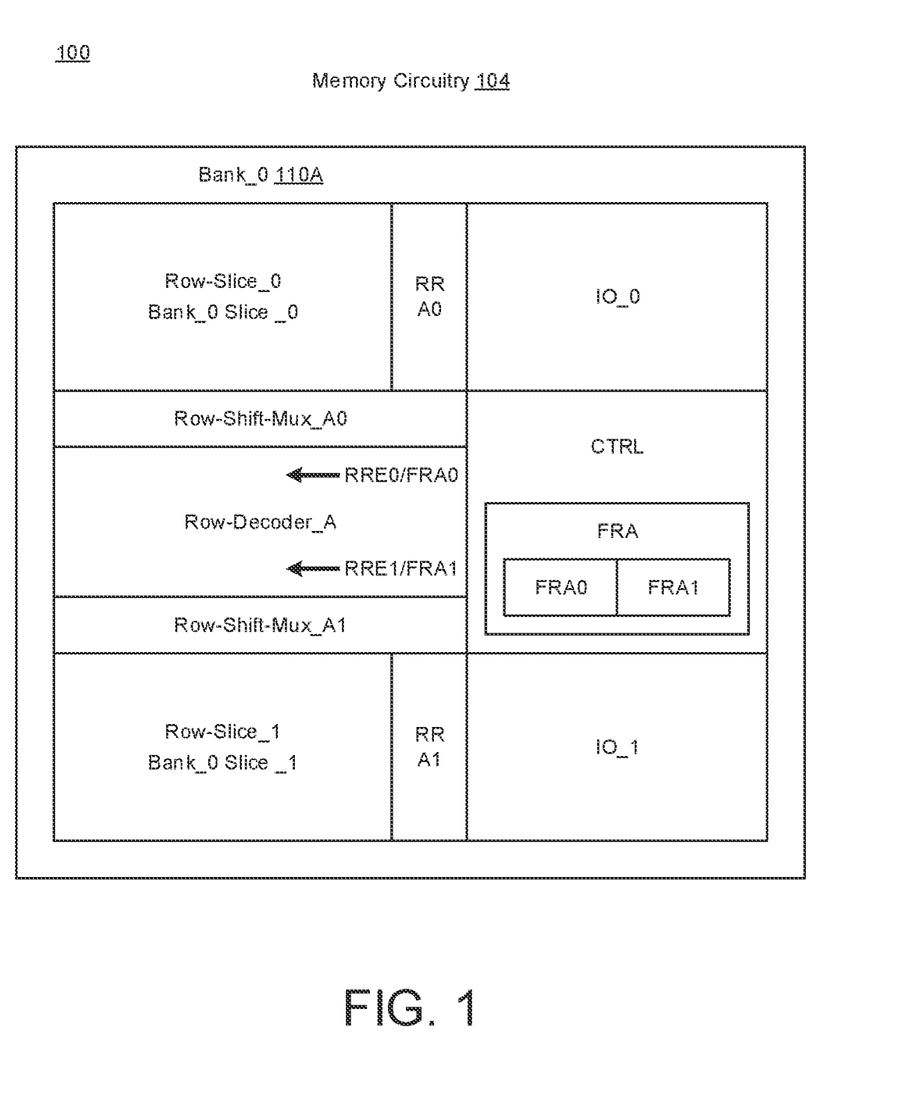
FIG. 1 illustrates a schematic diagram of memory circuitry in accordance with various implementations described herein.

FIG. 1 illustrates a diagram 100 of memory circuitry 104 with a bank of bitcells (Bank_0) 110A in accordance with various implementations described herein.

In some implementations, the memory circuitry 104 may provide for fabricating row repair related circuitry with various integrated circuit (IC) components arranged and/or coupled together as an assemblage or some combination of parts that provide for physical circuit designs and structures. In some instances, a method of designing, providing and fabricating the memory circuitry 104 as an integrated device may involve use of various circuit components and/or related structures described herein so as to thereby implement various row repair techniques associated therewith. Also, the memory circuitry 104 may be integrated with various circuitry and/or related components on a single chip, and also, the memory circuitry 104 may be implemented in some embedded devices for automotive, mobile, computer, server and IoT applications, including remote sensor nodes.

As shown in FIG. 1, the memory circuitry 104 may include the bank of bitcells (Bank_0) 110A that may be split into a plurality of portions including a first row slice of the bitcells (Row-Slice_0) and a second row slice of the bitcells (Row-Slice_1). Also, in some instances, the term slice may refer to a part or a portion, wherein the first row slice (Row-Slice_0) may refer to a first part/portion of bitcells (Bank_0, Slice_0) in the (Bank_0) 110A, and also, the second row slice (Row-Slice_1) may refer to a second part/portion of bitcells (Bank_0, Slice_1) in the (Bank_0) 110A. Also, the memory circuitry 104 may have control circuitry (CTRL) that is configured to access and repair a first bitcell in the first row slice (Row-Slice_0) with a first row address and a second bitcell in the second row slice (Row-Slice_1) with a second row address that is different than the first row address. As shown in FIG. 1, the plurality of portions may have two portions; however, in various instances, the plurality of portions may have any number of portions, including four portions.

In some implementations, the control circuitry (CTRL) may have FRA memory (or similar address storage capability) that is configured to store one or more faulty row addresses (e.g., FRA0, FRA1). Also, as described herein, FRA* refers to the faulty row address that is used to access and repair one or more bitcells in the bank (Bank_0), such as, e.g., access and repair the first bitcell in the first row slice (Row-Slice_0) with the first row address and also access and repair the second bitcell in the second row slice (Row-Slice_1) with the second row address.

In some implementations, the memory circuitry 104 may have row redundancy (RR) bitcells, including, e.g., first row redundancy bitcells (RR-A0) for repairing bitcells in the first row slice (Row-Slice_0) and second row redundancy bitcells (RR-A1) for repairing bitcells in the second row slice (Row-Slice_1). Also, the memory circuitry 104 may include first input-output circuitry (IO_0) for accessing data stored in first row slice (Row-Slice_0), and also, the memory circuitry 104 may include second input-output circuitry (IO_1) for accessing data stored in second row slice (Row-Slice_1). Also, the memory circuitry 104 may include a row decoder (Row-Decoder_A) for row select/access operations including, e.g., row select/access of the first bitcell in the first row slice (Row-Slice_0) by way of first row shift multiplexer (Row-Shift_Mux_A0) and also for row select/access of the second bitcell in the second row slice (Row-Slice_1) by way of second row shift multiplexer (Row-Shift_Mux_A1).

In various implementations, each bitcell in the bank (Bank_0) 110A of bitcells may be referred to as a memory cell, and each bitcell may be configured to store at least one data bit value (e.g., a data value associated with logical '0' or '1'). Each row of bitcells (e.g., row_0, row_1, ..., row_n) in the row slices (Row-Slice_0, Row-Slice_1) of the bank (Bank_0) 110A of bitcells may include any number of memory cells arranged in various configurations, such as, e.g., a two-dimensional (2D) memory array having columns and rows of multiple bitcells (or memory cells) arranged in a 2D grid pattern. Also, each bitcell may be implemented with random access memory (RAM) circuitry, or some other type of volatile type memory. In some instances, each memory cell may include a multi-transistor static RAM (SRAM) cell, including various types of SRAM cells, such as, e.g., 6T CMOS SRAM and/or other types of complementary MOS (CMOS) SRAM cells, such as, e.g., 4T, 8T, 10T, or more transistors per bit.

As described herein, the bank of bitcells (Bank_0) 110A is split into a plurality of portions including a first row slice of the bitcells (Row-Slice_0) and a second row slice of the bitcells (Row-Slice_1). In some instances, each bitcell in the first row slice (Row-Slice_0) is accessible via the first row address, and each bitcell in the second row slice (Row-Slice_1) is accessible via the second row address that is different than the first row address (Row-Slice_0). Also, in some instances, the bank of bitcells (Bank_0) 110A may refer to a single bank of bitcells that is split into the plurality of portions (e.g., two portions) including the first row slice (Row-Slice_0) and the second row slice (Row-Slice_1).

Also, in some implementations, the control circuitry (CTRL) may be configured to access and repair two different bitcells in the bank (Bank_0) 110A that is split into two portions with two different addresses including the first bitcell in the first row slice (Row-Slice_0) with the first row address and the second bitcell in the second row slice (Row-Slice_1) with the second row address that is different than the first row address. Also, the control circuitry (CTRL) may be configured to use multiple row redundancy enable signals (RRE0/FRA0, RRE1/FRA1) to access and repair the first bitcell and the second bitcell in corresponding row slices (Row-Slice_0, Row-Slice_1). Also, the control circuitry (CTRL) may be configured with row dedicated repair of two different bitcells in the bank (Bank_0) 110A split into the two portions with two different addresses by separately accessing and repairing each half of the two portions as the first row slice of the bitcells (Row-Slice_0) and as the second row slice of the bitcells (Row-Slice_1). Also, the first row address may be a first dedicated row repair address for the first bitcell in the first row slice (Row-Slice_0) of the bank (Bank_0) 110A, and the second row address may be a second dedicated row repair address for the second bitcell in the second row slice (Row-Slice_1) of the bank (Bank_0) 110A, and the first dedicated row repair address is different than the second dedicated row repair address.

In some implementations, the control circuitry (CTRL) is configured to interface and communicate with the row decoder (Row-Decoder_A) and the input-output circuitry (IO_0, IO_1) so as to access and repair multiple bitcells (e.g., two bitcells) in the row slices (Row-Slice_0, Row-Slice_1) of the bank (Bank_0) 110A. As such, in various instances, the control circuitry (CTRL) may separately interface and communicate with the row slices (Row-Slice_0, Row-Slice_1) in the bank (Bank_0) 110A by way of the row decoder (Row-Decoder_A) and the input-output circuitry (IO_0, IO_1). Also, in some instances, the row decoder (Row-Decoder_A) may interface and communicate with the row slices (Row-Slice_0, Row-Slice_1) in the bank (Bank_0) 110A by way of the corresponding row shift multiplexers (Row-Shift-Mux_A0, Row-Shift-Mux_A1). Also, the control circuitry (CTRL) may separately access and repair the first bitcell in the first row slice (Row-Slice_0) with the first row redundancy bitcells (RR-A0), and the control circuitry (CTRL) may separately access and repair the second bitcell in the second row slice (Row-Slice_1) with the second row redundancy bitcells (RR-A1).

Figure 2:
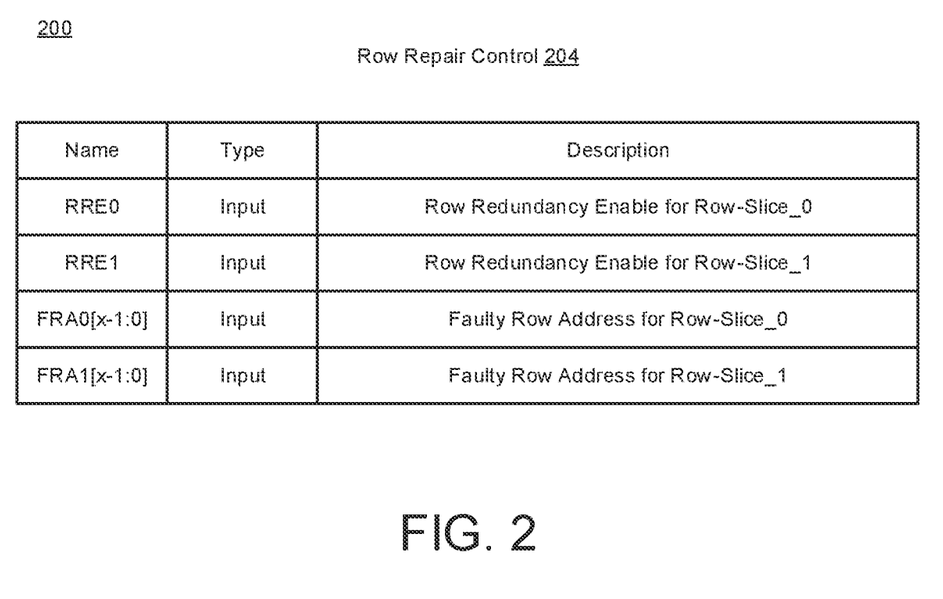
FIG. 2 illustrates a diagram of row repair control in accordance with various implementations described herein.

FIG. 2 illustrates a table diagram 200 of row repair control 204 in accordance with various implementations described herein.

In some implementations, as described herein, the control circuitry (CTRL) may be configured to interface and communicate with the row decoder (Row-Decoder_A) so as to access and repair multiple bitcells (e.g., two bitcells) in the row slices (Row-Slice_0, Row-Slice_1) of the bank (Bank_0) 110A. Also, as shown in FIG. 2, the control circuitry (CTRL) may be configured to use multiple row redundancy enable signals (RRE0/FRA0, RRE1/FRA1) to access and repair the first bitcell and the second bitcell in the row slices (Row-Slice_0, Row-Slice_1) in the bank (Bank_0) 110A.

In some implementations, the control circuitry (CTRL) may be configured to use a first row redundancy enable signal (RRE0) as an input signal to the row decoder (Row-Decoder_A) so as to access and repair the first bitcell in the first row slice (Row-Slice_0), and also, the control circuitry (CTRL) may be configured to use a second row redundancy enable signal (RRE1) as another input signal to the row decoder (Row-Decoder_A) so as to access and repair the second bitcell in the second row slice (Row-Slice_1).

In some implementations, the control circuitry (CTRL) may be configured to use faulty row address (FRA) signals. As such, the control circuitry (CTRL) may be configured to use a first faulty row address signal (FRA0 [x−1:0]) as an input signal to the row decoder (Row-Decoder_A) so as to designate a row of bitcells in the first row slice (Row-Slice_0) as faulty due to multiple faulty bitcells in a row, and also, the control circuitry (CTRL) may be configured to use a second faulty row address signal (FRA1 [x−1:0]) as another input signal to the row decoder (Row-Decoder_A) so as to designate a row of bitcells in the second row slice (Row-Slice_1) as faulty due to multiple faulty bitcells in a row.

Figure 3:
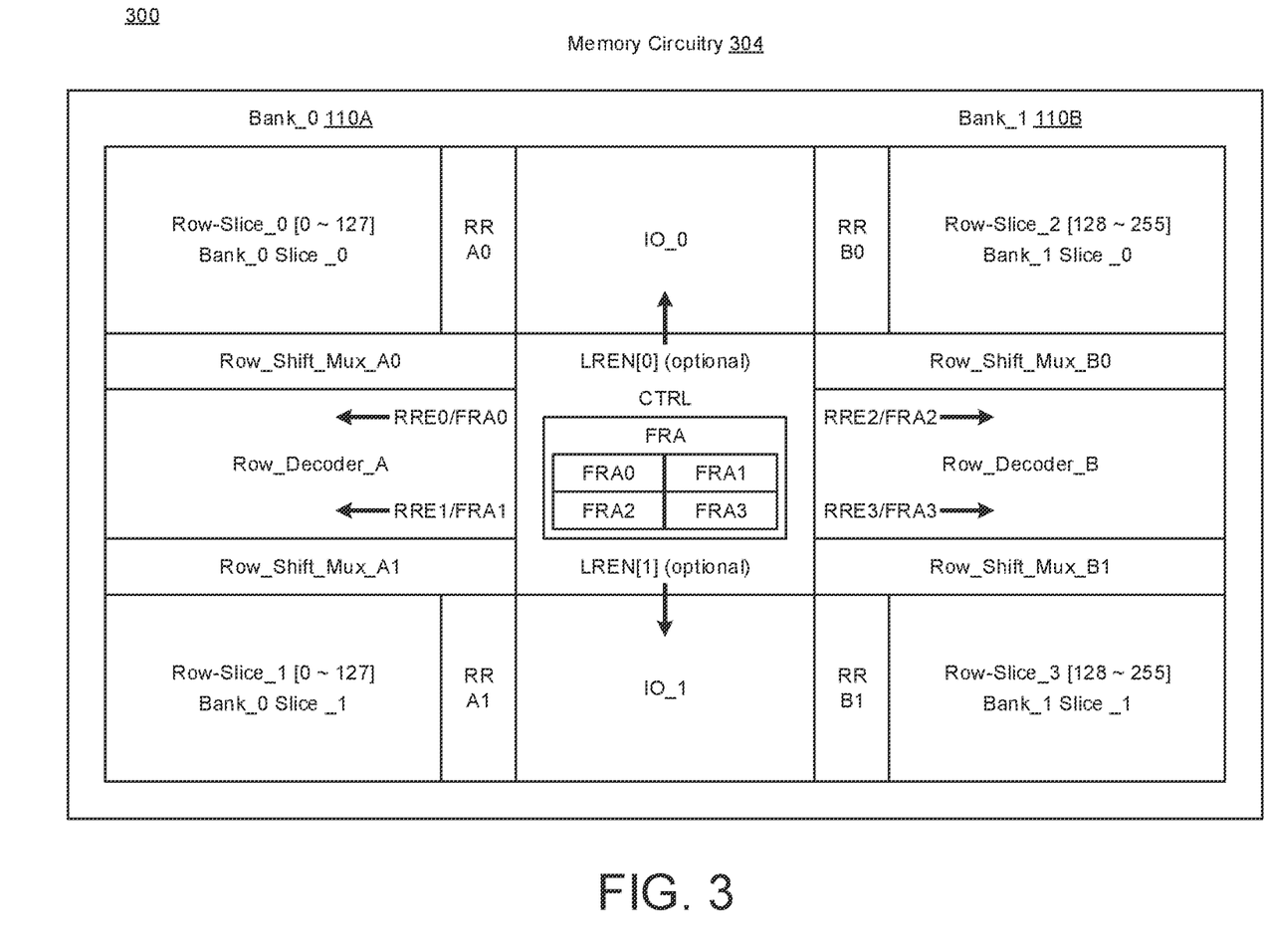
FIG. 3 illustrates a schematic diagram of memory circuitry in accordance with various implementations described herein.

FIG. 3 illustrates a diagram 300 of memory circuitry 304 with banks of bitcells (Bank_0, Bank_1) in accordance with various implementations described herein.

In some implementations, the memory circuitry 304 may provide for fabricating row repair related circuitry with various integrated circuit (IC) components arranged and/or coupled together as an assemblage or some combination of parts that provide for physical circuit designs and structures. In some instances, a method of designing, providing and fabricating the memory circuitry 304 as an integrated device may involve use of various circuit components and/or related structures described herein so as to thereby implement various row repair techniques associated therewith. Also, the memory circuitry 304 may be integrated with various circuitry and/or related components on a single chip, and also, the memory circuitry 304 may be implemented in some embedded devices for automotive, mobile, computer, server and IoT applications, including remote sensor nodes.

As shown in FIG. 3, the memory circuitry 304 may include multiple banks of bitcells (Bank_0, Bank_1) 110A, 110B that may be split into a plurality of corresponding portions including a first row slice of the bitcells (Row-Slice_0), a second row slice of the bitcells (Row-Slice_1), a third row slice of the bitcells (Row-Slice_2), a fourth row slice of the bitcells (Row-Slice_3). Also, as described herein, the term slice may refer to a part or a portion such that, e.g., the first row slice (Row-Slice_0) may refer to a first part/portion of bitcells (Bank_0, Slice_0) in the (Bank_0) 110A, and also, the second row slice (Row-Slice_1) may refer to a second part/portion of bitcells (Bank_0, Slice_1) in the (Bank_0) 110A. Also, the third row slice (Row-Slice_2) may refer to a third part/portion of bitcells (Bank_1, Slice_0) in the (Bank_1) 110B, and also, the fourth row slice (Row-Slice_3) may refer to a fourth part/portion of bitcells (Bank_1, Slice_1) in the (Bank_1) 110B.

Thus, in some implementations, the memory circuitry 304 may include the first bank (Bank_0) 110A having first bitcells partitioned into a plurality of portions including a first row slice of the first bitcells (Row-Slice_0) and a second row slice of the first bitcells (Row-Slice_1). Also, in some implementations, the memory circuitry 304 may include the second bank (Bank_1) 110B having second bitcells partitioned into another plurality of portions including a third row slice of the second bitcells (Row-Slice_2) and a fourth row slice of the second bitcells (Row-Slice_3).

Also, in some instances, the first part/portion of bitcells (Bank_0, Slice_0) in the (Bank_0) 110A may refer to 0~127 bits in the first row slice (Row-Slice_0). Also, the second part/portion of bitcells (Bank_0, Slice_1) in the (Bank_0) 110A may refer to 0~127 bits in the second row slice (Row-Slice_1). Also, the third part/portion of bitcells (Bank_1, Slice_0) in the (Bank_1) 110B may refer to 128~255 bits in the third row slice (Row-Slice_2). Also, the fourth part/portion of bitcells (Bank_1, Slice_1) in the (Bank_1) 110B may refer to 128~255 bits in the fourth row slice (Row-Slice_3).

Also, in various implementations, the memory circuitry 304 may include control circuitry (CTRL) that is configured to access and repair a first bitcell in the first row slice (Row-Slice_0) with a first row address and a second bitcell in the second row slice (Row-Slice_1) with a second row address that is different than the first row address. Also, the control circuitry (CTRL) may be configured to access and repair a third bitcell in the third row slice (Row-Slice_2) with a third row address and a fourth bitcell in the fourth row slice (Row-Slice_3) with a fourth row address that is different than the third row address. Also, as shown in FIG. 3, the plurality of portions may have four portions; however, in various instances, the plurality of portions may be any number of portions. Therefore, the control circuitry (CTRL) may be configured to access and/or repair two different first bitcells in the first bank (Bank_0) 110A with a first pair of different addresses and two different second bitcells in the second bank (Bank_1) 110B with a second pair of different addresses In various implementations, the control circuitry (CTRL) may have FRA memory (or similar address storage capability) that is configured to store one or more faulty row addresses (e.g., FRA0, FRA1, FRA2, FRA3, etc.). Also, as described herein, FRA* refers to the faulty row addresses that may be used to access and repair one or more bitcells in the banks (Bank_0, Bank_1). For instance, the control circuitry (CTRL) may be configured to use one or more faulty row addresses (e.g., FRA0, FRA1, FRA2, FRA3, etc.) so as to access and repair the first bitcell in the first row slice (Row-Slice_0) with the first row address, access and repair the second bitcell in the second row slice (Row-Slice_1) with the second row address, access and repair the third bitcell in the third row slice (Row-Slice_2) with the third row address, and also, access and repair the fourth bitcell in the fourth row slice (Row-Slice_3) with the fourth row address.

In some implementations, the memory circuitry 304 may have row redundancy (RR) bitcells, including, e.g., first row redundancy bitcells (RR-A0) for repairing bitcells in the first row slice (Row-Slice_0) and second row redundancy bitcells (RR-A1) for repairing bitcells in the second row slice (Row-Slice_1). Also, the row redundancy (RR) bitcells may include third row redundancy bitcells (RR-B0) for repairing bitcells in the third row slice (Row-Slice_2) and fourth row redundancy bitcells (RR-B1) for repairing bitcells in the fourth row slice (Row-Slice_3). Also, the memory circuitry 304 may have first input-output circuitry (IO_0) for accessing data stored in the first row slice (Row-Slice_0) and the third row slice (Row-Slice_2), and also, the memory circuitry 304 may include second input-output circuitry (IO_1) for accessing data stored in second row slice (Row-Slice_1) and the fourth row slice (Row-Slice_3). Also, the control circuitry (CTRL) may interface and communicate with input-output circuitry (IO_0, IO_1) by way of optional enable signals, such as, e.g., a first left-right enable signal (LREN[0] and a second left-right enable signal (LREN[1]), which are used by the control circuitry (CTRL) to separately select and access the first bank (Bank_0) 110A on the left-side of the memory circuitry 304 with first LREN[0] signal or separately select and access the second bank (Bank_1) 110B on the right-side of the memory circuitry 304 with second LREN[1] signal.

Also, in some implementations, the memory circuitry 304 may have a first row decoder (Row-Decoder_A) for row select/access operations in Bank_0, including, e.g., row select/access of the first bitcell in the first row slice (Row-Slice_0) by way of first row shift multiplexer (Row-Shift_Mux_A0) and also for row select/access of the second bitcell in the second row slice (Row-Slice_1) by way of second row shift multiplexer (Row-Shift_Mux_A1). Also, the memory circuitry 304 may have a second row decoder (Row-Decoder_B) for row select/access operations in Bank_1, including, e.g., row select/access of the third bitcell in the third row slice (Row-Slice_2) by way of third row shift multiplexer (Row-Shift_Mux_B0) and also for row select/access of the fourth bitcell in the fourth row slice (Row-Slice_3) by way of second row shift multiplexer (Row-Shift_Mux_B1).

In various implementations, each bitcell in the banks (Bank_0, Bank_1) 110A, 110B may be referred to as a memory cell, and each bitcell may be configured to store at least one data bit value (e.g., a data value associated with logical '0' or '1'). Each row of bitcells (e.g., row_0, row_1, ..., row_n) in the row slices (Row-Slice_0, Row-Slice_1, Row-Slice_2, Row-Slice_3) of the banks (Bank_0, Bank_1) 110A, 110B may have any number of memory cells arranged in various configurations, such as, e.g., a two-dimensional (2D) memory array having columns and rows of multiple bitcells (or memory cells) arranged in a 2D grid pattern. Also, each bitcell may be implemented with random access memory (RAM) circuitry, or some other type of volatile type memory. In some instances, each memory cell may include a multi-transistor static RAM (SRAM) cell, including various types of SRAM cells, such as, e.g., 6T CMOS SRAM and/or other types of complementary MOS (CMOS) SRAM cells, such as, e.g., 4T, 8T, 10T, or more transistors per bit.

As described herein, the bank of bitcells (Bank_0, Bank_1) 110A, 110B is split into a plurality of portions (e.g., 4 portions) including a first row slice of the bitcells (Row-Slice_0), a second row slice of the bitcells (Row-Slice_1), a third row slice of the bitcells (Row-Slice_2), and a fourth row slice of the bitcells (Row-Slice_3). In various instances, each bitcell in the first row slice (Row-Slice_0) is accessible via the first row address, and also, each bitcell in the second row slice (Row-Slice_1) is accessible via the second row address that is different than the first row address (Row-Slice_0). Also, each bitcell in the third row slice (Row-Slice_2) is accessible via the third row address, and each bitcell in the fourth row slice (Row-Slice_3) is accessible via the fourth row address that is different than the third row address (Row-Slice_2). Also, in some instances, the bank of bitcells (Bank_0, Bank_1) 110A, 110B may refer to multiple banks of bitcells that are split into the plurality of portions (e.g., four portions), including, e.g., the first row slice (Row-Slice_0), the second row slice (Row-Slice_1), the third row slice (Row-Slice_2), and the fourth row slice (Row-Slice_3).

Also, in some implementations, the control circuitry (CTRL) may be configured to access and repair two different bitcells in the first bank (Bank_0) 110A and two different bitcells in the second bank (Bank_1) 110B. For instance, the control circuitry (CTRL) may be configured to access and repair two different bitcells in the first bank (Bank_0) 110A that is split into two portions with two different addresses including the first bitcell in the first row slice (Row-Slice_0) with the first row address and the second bitcell in the second row slice (Row-Slice_1) with the second row address that is different than the first row address. Also, the control circuitry (CTRL) may be configured to access and repair two different bitcells in the second bank (Bank_1) 110B that is split into two portions with two different addresses including the third bitcell in the third row slice (Row-Slice_2) with the third row address and the fourth bitcell in the fourth row slice (Row-Slice_3) with the fourth row address that is different than the third row address.

In some implementations, the two different first bitcells in the first bank (Bank_0) 110A may include a first bitcell in first row slice (Row-Slice_0) of the first bank (Bank_0) 110A, and the two different first bitcells in the first bank include a second bitcell in the second row slice (Row-Slice_1) of the first bank (Bank_0) 110A, wherein the first bitcell is different than the second bitcell. Also, the two different second bitcells in the second bank (Bank_1) 110B may include a third bitcell in the third row slice (Row-Slice_2) of the second bank (Bank_1) 110B, and also, the two different first bitcells in the second bank (Bank_1) 110B may include a fourth bitcell in the fourth row slice (Row-Slice_3) of the second bank (Bank_1), wherein the third bitcell is different than the fourth bitcell.

In some implementations, the first pair of different addresses may include a first row address and a second row address that is different than the first row address, and the control circuitry (CTRL) may be configured to access and repair the first bitcell in the first row slice (Row-Slice_0) of the first bank (Bank_0) 110A with the first row address and the second bitcell in the second row slice (Row-Slice_1) with the second row address. Also, in some instances, the second pair of different addresses may include a third row address and a fourth row address that is different than the third row address, and also, the control circuitry (CTRL) may be configured to access and repair the third bitcell in the third row slice (Row-Slice_2) of the second bank (Bank_1) 110B with the third row address and the fourth bitcell in the fourth row slice (Row-Slice_3) with the fourth row address.

Also, in some implementations, the control circuitry (CTRL) may be configured to use multiple row redundancy enable signals (RRE0/FRA0, RRE1/FRA1, RRE2/FRA2, RRE3/FRA3) to access and repair the first bitcell, the second bitcell, the third bitcell and the fourth bitcell in corresponding row slices (Row-Slice_0, Row-Slice_1, Row-Slice_2, Row-Slice_3). Also, the control circuitry (CTRL) may be configured with row dedicated repair of two different bitcells in each bank (Bank_0, Bank_1) 110A, 110B that are each split into two portions with two different addresses by separately accessing and repairing each half of the two portions as the first row slice of the bitcells (Row-Slice_0) and as the second row slice of the bitcells (Row-Slice_1) and by separately accessing and repairing each half of the two portions as the third row slice of the bitcells (Row-Slice_2) and as the fourth row slice of the bitcells (Row-Slice_3). Also, the first row address may be a first dedicated row repair address for the first bitcell in the first row slice (Row-Slice_0) of the first bank (Bank_0) 110A, and the second row address may be a second dedicated row repair address for the second bitcell in the second row slice (Row-Slice_1) of the first bank (Bank_0) 110A, wherein the first dedicated row repair address is different than the second dedicated row repair address. Also, the third row address may be a third dedicated row repair address for the third bitcell in the third row slice (Row-Slice_2) of the second bank (Bank_1) 110B, and the fourth row address may be a second dedicated row repair address for the fourth bitcell in the fourth row slice (Row-Slice_3) of the second bank (Bank_1) 110B, wherein the third dedicated row repair address is different than the fourth dedicated row repair address.

In some implementations, the control circuitry (CTRL) is configured to interface and communicate with the first row decoder (Row-Decoder_A) and input-output circuitry (IO_0, IO_1) so as to access and repair multiple bitcells (e.g., two bitcells) in the row slices (Row-Slice_0, Row-Slice_1) of the first bank (Bank_0) 110A. Thus, in some instances, the control circuitry (CTRL) may separately interface and communicate with the row slices (Row-Slice_0, Row-Slice_1) in the first bank (Bank_0) 110A by way of first row decoder (Row-Decoder_A) and input-output circuitry (IO_0, IO_1). Also, in some instances, the first row decoder (Row-Decoder_A) may interface and communicate with the row slices (Row-Slice_0, Row-Slice_1) in the first bank (Bank_0) 110A by way of the corresponding row shift multiplexers (Row-Shift-Mux_A0, Row-Shift-Mux_A1). Also, the control circuitry (CTRL) may separately access and repair the first bitcell in first row slice (Row-Slice_0) with first row redundancy bitcells (RR-A0), and the control circuitry (CTRL) may separately access and repair the second bitcell in the second row slice (Row-Slice_1) with the second row redundancy bitcells (RR-A1).

In some implementations, the control circuitry (CTRL) is configured to interface and communicate with the second row decoder (Row-Decoder_B) along with input-output circuitry (IO_0, IO_1) so as to access and repair multiple bitcells (e.g., two bitcells) in the row slices (Row-Slice_2, Row-Slice_3) of the second bank (Bank_1) 110B. Thus, in some instances, the control circuitry (CTRL) may separately interface and communicate with the row slices (Row-Slice_2, Row-Slice_3) in the second bank (Bank_1) 110B by way of second row decoder (Row-Decoder_B) and input-output circuitry (IO_0, IO_1). Also, the second row decoder (Row-Decoder_B) may interface and communicate with row slices (Row-Slice_2, Row-Slice_3) in the second bank (Bank_1) 110B by way of corresponding row shift multiplexers (Row-Shift-Mux_B0, Row-Shift-Mux_B1). Also, the control circuitry (CTRL) may separately access and repair the third bitcell in third row slice (Row-Slice_2) with third row redundancy bitcells (RR-B0), and control circuitry (CTRL) may separately access and repair the fourth bitcell in the fourth row slice (Row-Slice_3) with the fourth row redundancy bitcells (RR-B1).

Thus, in some implementations, the control circuitry (CTRL) may be configured to use multiple row redundancy enable signals (RRE0/FRA0, RRE1/FRA1, RRE2/FRA2, RRE3/FRA3) to access and repair two different first bitcells in the first bank (Bank_0) 110A with the first pair of different addresses and also two different second bitcells in the second bank (Bank_1) 110B with the second pair of different addresses. Also, in various instances, the first bank of first bitcells (Bank_0) 110A is separate and different than the second bank of second bitcells (Bank_1) 110B.

Figure 4:
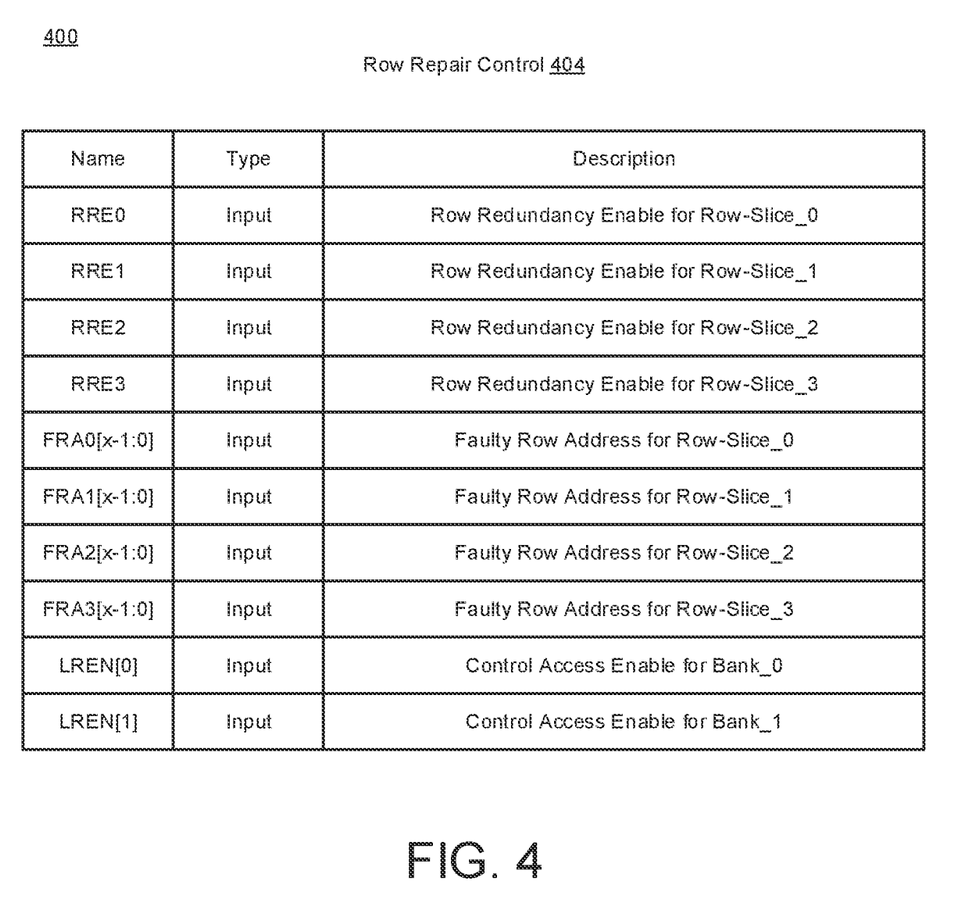
FIG. 4 illustrates a diagram of row repair control in accordance with various implementations described herein.

FIG. 4 illustrates a table diagram 400 of row repair control 404 in accordance with various implementations described herein.

In some implementations, as described herein, the control circuitry (CTRL) may be configured to interface and communicate with the first row decoder (Row-Decoder_A) so as to access and repair multiple bitcells (e.g., two bitcells) in row slices (Row-Slice_0, Row-Slice_1) of the first bank (Bank_0) 110A. Also, as shown in FIG. 4, control circuitry (CTRL) may be configured to use multiple row redundancy enable signals (RRE0/FRA0, RRE1/FRA1) to access and repair the first bitcell and the second bitcell in the row slices (Row-Slice_0, Row-Slice_1) in the first bank (Bank_0) 110A.

In some implementations, as described herein, the control circuitry (CTRL) may be configured to interface and communicate with second row decoder (Row-Decoder_B) so as to access and repair multiple bitcells (e.g., two bitcells) in row slices (Row-Slice_2, Row-Slice_3) of the second bank (Bank_1) 110B. Also, as shown in FIG. 4, the control circuitry (CTRL) may also be configured to use multiple row redundancy enable signals (RRE2/FRA2, RRE3/FRA3) to access and repair the third bitcell and the fourth bitcell in the row slices (Row-Slice_2, Row-Slice_3) in the second bank (Bank_1) 110B.

In some implementations, the control circuitry (CTRL) may be configured to use a first row redundancy enable signal (RRE0) as an input signal to first row decoder (Row-Decoder_A) so as to access and repair the first bitcell in the first row slice (Row-Slice_0), and also, the control circuitry (CTRL) may be configured to use a second row redundancy enable signal (RRE1) as another input signal to first row decoder (Row-Decoder_A) so as to access and repair the second bitcell in the second row slice (Row-Slice_1).

Also, in some implementations, the control circuitry (CTRL) may be configured to use a third row redundancy enable signal (RRE2) as an input signal to the second row decoder (Row-Decoder_B) so as to access and repair the third bitcell in the third row slice (Row-Slice_2). In addition, in some implementations, the control circuitry (CTRL) may be configured to use a fourth row redundancy enable signal (RRE3) as another input signal to the second row decoder (Row-Decoder_B) so as to access and repair the fourth bitcell in the fourth row slice (Row-Slice_3).

In some implementations, the control circuitry (CTRL) may be configured to use faulty row address (FRA) signals. As such, the control circuitry (CTRL) may be configured to use a first faulty row address signal (FRA0 [x−1:0]) as an input signal to first row decoder (Row-Decoder_A) so as to designate a row of bitcells in the first row slice (Row-Slice_0) as faulty due to multiple faulty bitcells in a row. Also, the control circuitry (CTRL) may be configured to use a second faulty row address signal (FRA1 [x−1:0]) as another input signal to the row decoder (Row-Decoder_A) so as to designate a row of bitcells in the second row slice (Row-Slice_1) as faulty due to multiple faulty bitcells in a row.

Also, in some implementations, the control circuitry (CTRL) may be configured to use other faulty row address (FRA) signals. As such, the control circuitry (CTRL) may be configured to use a third faulty row address signal (FRA2 [x−1:0]) as an input signal to the second row decoder (Row-Decoder_B) so as to designate a row of bitcells in the third row slice (Row-Slice_2) as faulty due to multiple faulty bitcells in a row. In some instances, the control circuitry (CTRL) may be configured to use a fourth faulty row address signal (FRA3 [x−1:0]) as another input signal to the second row decoder (Row-Decoder_B) so as to designate a row of bitcells in the fourth row slice (Row-Slice_3) as faulty due to multiple faulty bitcells in a row.

In some implementations, the control circuitry (CTRL) may also be configured to optionally use left-right enable (LREN[0], LREN[1]) signals. Thus, in some instances, the control circuitry (CTRL) may be configured to optionally use the first left-right enable signal (LREN[0]) as an input signal to the first input-output circuitry (IO_0) so as to select and/or access the first bank (Bank_0) 110A, which is disposed adjacent to the left-side of the memory circuitry 304. Also, the control circuitry (CTRL) may be further configured to optionally use second left-right enable signal (LREN [1]) as an input signal to second input-output circuitry (IO_1) so as to select and/or access second bank (Bank_1) 110B, which is disposed adjacent to the right-side of the memory circuitry 304.

Figure 5:
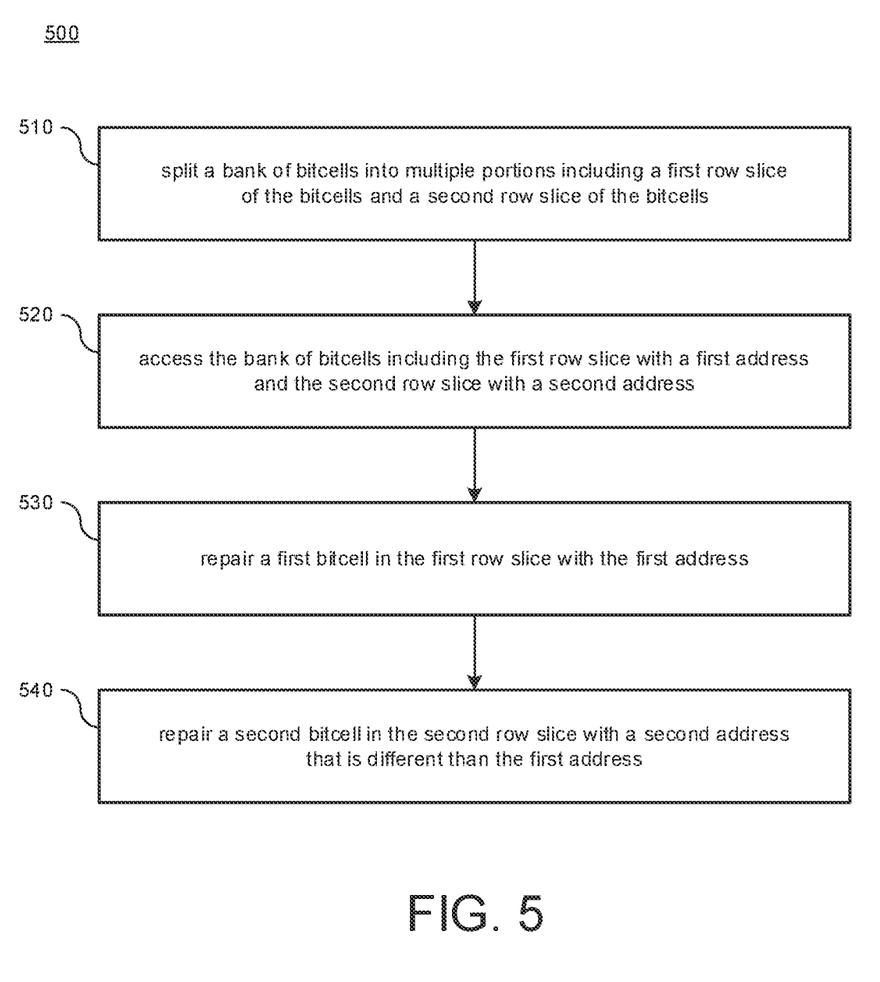
FIG. 5 illustrates a process flow diagram of a method for providing row repair in accordance with implementations described herein.

FIG. 5 illustrates a process flow diagram of a method for providing row repair in accordance with implementations described herein.

It should be understood that even though the method 500 indicates a particular order of operation execution, in some instances, various certain portions of the operations may be executed in a different order, and on different systems. In other cases, additional operations and/or steps may be added to and/or omitted from method 500. Also, method 500 may be implemented in hardware and/or software. If implemented in hardware, the method 500 may be implemented with various components and/or circuitry, as described herein in FIGS. 1-4. Also, if implemented in software, method 500 may be implemented with program and/or software instruction processes configured for providing row repair for memory applications, as described herein. Also, if implemented in software, instructions related to implementing method 500 may be stored in memory and/or a database. Also, in various instances, a computer or other types of computing devices having a processor and memory may be configured to perform method 500.

In various implementations, method 500 may refer to a method for designing, providing, fabricating and/or manufacturing row repair circuitry as an integrated system, device and/or circuit that involves use of various circuit components and related structures described herein so as to implement techniques associated therewith. Also, the row repair circuitry may be integrated with computing circuitry and various related components on a single chip, and row repair circuitry may be implemented in various embedded systems for various electronic, mobile and IoT applications, including remote sensor nodes.

At block 510, method 500 may split a bank of bitcells into a plurality of portions including a first row slice and a second row slice. At block 520, method 500 may access the bank of bitcells including the first row slice with a first address and the second row slice with a second address. At block 530, method 500 may repair a first bitcell in the first row slice with the first address, and at block 540, method 500 may repair a second bitcell in the second row slice with a second address that is different than the first address.

In various implementations, the bank of bitcells (or memory cells) may refer to a single bank of bitcells that is split into multiple portions, such as at least two portions, including the first row slice of the bitcells as a first portion and the second row slice of the bitcells as a second portion that is separate and different form the first portion. Also, each bitcell in the first row slice may be accessible via the first address, and each bitcell in the second row slice may be accessible via the second address that is different than the first address. Also, repairing the bitcells in the bank may include repairing two different bitcells in the bank with two different addresses including repairing the first bitcell in the first row slice with the first address and repairing the second bitcell in the second row slice with the second address that is different than the first address.

In various implementations, method 500 may interface with control circuitry that is configured to repair two different bitcells in the bank with two different addresses, e.g., by separately repairing the first bitcell in the first row slice with the first address and also by separately repairing the second bitcell in the second row slice with the second address that is different than the first address. Also, the first address may refer to a first dedicated row repair address for the first bitcell in the first row slice of the bank, and also, the second address may refer to a second dedicated row repair address for the second bitcell in the second row slice of the bank. Also, the first dedicated row repair address is different than the second dedicated row repair address.

Figure 6:
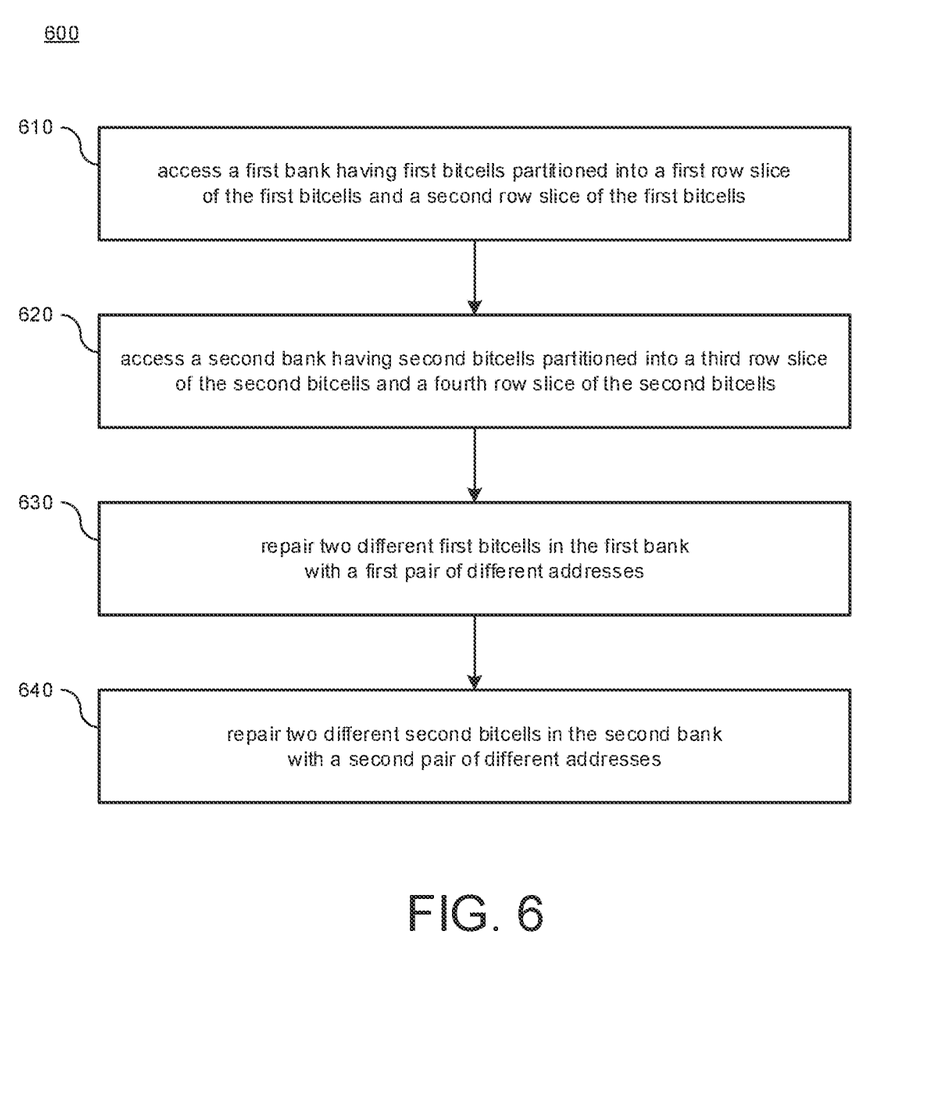
FIG. 6 illustrates a process flow diagram of a method for providing row repair in accordance with implementations described herein.

FIG. 6 illustrates a process flow diagram of a method for providing row repair in accordance with implementations described herein.

It should be understood that even though the method 600 indicates a particular order of operation execution, in some instances, various certain portions of the operations may be executed in a different order, and on different systems. In other cases, additional operations and/or steps may be added to and/or omitted from method 600. Also, method 600 may be implemented in hardware and/or software. If implemented in hardware, the method 600 may be implemented with various components and/or circuitry, as described herein in FIGS. 1-4. Also, if implemented in software, method 600 may be implemented with program and/or software instruction processes configured for providing row repair for memory applications, as described herein. Also, if implemented in software, instructions related to implementing method 600 may be stored in memory and/or a database. Also, in various instances, a computer or other types of computing devices having a processor and memory may be configured to perform method 600.

In various implementations, method 600 may refer to a method for designing, providing, fabricating and/or manufacturing row repair circuitry as an integrated system, device and/or circuit that involves use of various circuit components and related structures described herein so as to implement techniques associated therewith. Also, the row repair circuitry may be integrated with computing circuitry and various related components on a single chip, and row repair circuitry may be implemented in various embedded systems for various electronic, mobile and IoT applications, including remote sensor nodes.

At block 610, method 600 may access a first bank having first bitcells partitioned into a first row slice of the first bitcells and a second row slice of the first bitcells. At block 620, method 600 may access a second bank having second bitcells partitioned into a third row slice of the second bitcells and a fourth row slice of the second bitcells. At block 630, method 600 may repair two different first bitcells in the first bank with a first pair of different addresses. Also, at block 640, method 600 may repair two different second bitcells in the second bank with a second pair of different addresses.

In various implementations, the two different first bitcells in the first bank include a first bitcell in the first row slice of the first bank along with a second bitcell in the second row slice of the first bank, and the first bitcell is different than the second bitcell. Also, the first pair of different addresses may include a first row address and a second row address that is different than the first row address, and also, method 600 may interface with control circuitry that is configured to access and repair the first bitcell in the first row slice of the first bank with the first row address and also to access and repair the second bitcell in the second row slice with the second row address.

Also, in various implementations, the two different second bitcells in the second bank may include a third bitcell in the third row slice of the second bank along with a fourth bitcell in the fourth row slice of the second bank, and the third bitcell is different than the fourth bitcell. Also, the second pair of different addresses may include a third row address and a fourth row address that is different than the third row address, and method 600 may interface with the control circuitry to access and repair the third bitcell in the third row slice of the second bank with the third row address and to access and repair the fourth bitcell in the fourth row slice with the fourth row address.

Also, in various implementations, method 600 may utilize control circuitry that is configured to use multiple row redundancy enable signals to access and repair the two different first bitcells in the first bank with the first pair of different addresses and to access and repair the two different second bitcells in the second bank with the second pair of different addresses. Further, in this instance, the first bank of first bitcells is separate and different than the second bank of the second bitcells.

It should be intended that the subject matter of the claims may not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device with a bank of bitcells split into a plurality of portions including a first row slice of the bitcells and a second row slice of the bitcells. The device may have control circuitry configured to access and repair a first bitcell in the first row slice with a first row address and a second bitcell in the second row slice with a second row address that is different than the first row address.

Described herein are various implementations of a device having a first bank with first bitcells partitioned into a plurality of portions including a first row slice of the first bitcells and a second row slice of the first bitcells. The device may have a second bank with second bitcells partitioned into another plurality of portions including a third row slice of the second bitcells and a fourth row slice of the second bitcells. The device may have control circuitry configured to access and repair two different first bitcells in the first bank with a first pair of different addresses and two different second bitcells in the second bank with a second pair of different addresses.

Described herein are various implementations of a method. The method may split a bank of bitcells into a plurality of portions including a first row slice and a second row slice. The method may access the bank of bitcells including the first row slice with a first address and the second row slice with a second address. The method may repair the bitcells in the bank including a first bitcell in the first row slice with the first address and a second bitcell in the second row slice with the second address.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various related techniques described herein, other and further implementations may be devised in accordance with the disclosure herein, which may be determined by the claims that follow.

Although the subject matter has been described herein in language specific to structural features and/or methodological acts, it should be understood that the subject matter defined in the appended claims is not necessarily limited to the specific features or acts described above. Rather, specific features and acts described above are disclosed as example forms of implementing the claims.

What is claimed is:

1. A device comprising:
   a bank of bitcells split into a plurality of portions including a first row slice of the bitcells and a second row slice of the bitcells;
   first redundancy bitcells disposed horizontally adjacent to the first row slice;
   second redundancy bitcells disposed horizontally adjacent to the second row slice; and
   control circuitry configured to:
      access a first bitcell in the first row slice using a first row address to enable repair of the first bitcell using the first redundancy bitcells; and
      access a second bitcell in the second row slice using a second row address that is different than the first row address to enable repair of the second bitcell using the second redundancy bitcells.

2. The device of claim 1, wherein the plurality of portions include two portions or four portions.

3. The device of claim 1, wherein:
   each bitcell in the first row slice of the bitcells is accessible via the first row address, and
   each bitcell in the second row slice of the bitcells is accessible via the second row address that is different than the first row address.

4. The device of claim 1, wherein:
   the bank of bitcells is a single bank of bitcells split into the plurality of portions including the first row slice of the bitcells and the second row slice of the bitcells.

5. The device of claim 1, wherein:
the control circuitry is disposed vertically between the first row slice and the second row slice.

6. The device of claim 1, wherein:
the control circuitry is configured to use multiple row redundancy enable signals to access and repair the first bitcell and the second bitcell.

7. The device of claim 1, wherein:
the control circuitry is configured to perform row dedicated repair by separately accessing and repairing the first bitcell in the first row slice using the first redundancy bitcells and the second bitcell in the second row slice using the second redundancy bitcells.

8. The device of claim 1, wherein:
the first row address is a first dedicated row repair address for the first bitcell in the first row slice of the bank,
the second row address is a second dedicated row repair address for the second bitcell in the second row slice of the bank, and
the first dedicated row repair address is different than the second dedicated row repair address.

9. A device comprising:
a first bank having first bitcells partitioned into a plurality of portions including a first row slice of the first bitcells and a second row slice of the first bitcells;
a second bank having second bitcells partitioned into another plurality of portions including a third row slice of the second bitcells and a fourth row slice of the second bitcells; and
control circuitry disposed vertically between the first row slice and the second row slice, disposed vertically between the third row slice and the fourth row slice, the control circuitry configured to:
 access two different first bitcells in the first bank using a first pair of different addresses to enable repair of two different first bitcells using redundancy bitcells; and
 access two different second bitcells in the second bank using a second pair of different addresses to enable repair of two different second bitcells using redundancy bitcells.

10. The device of claim 9, wherein:
one of the two different first bitcells in the first bank includes a first bitcell in the first row slice of the first bank,
another of the two different first bitcells in the first bank includes a second bitcell in the second row slice of the first bank, and
the first bitcell is different from the second bitcell.

11. The device of claim 10, wherein:
the first pair of different addresses include a first row address and a second row address that is different from the first row address, and
the control circuitry is configured to:
 access the first bitcell in the first row slice of the first bank using the first row address to enable repair of the first bitcell; and
 access the second bitcell in the second row slice using the second row address to enable repair of the second bitcell.

12. The device of claim 9, wherein:
one of the two different second bitcells in the second bank includes a third bitcell in the third row slice of the second bank,
another of the two different second bitcells in the second bank includes a fourth bitcell in the fourth row slice of the second bank, and
the third bitcell is different from the fourth bitcell.

13. The device of claim 12, wherein:
the second pair of different addresses includes a third row address and a fourth row address that is different from the third row address, and
the control circuitry is configured to:
 access the third bitcell in the third row slice of the second bank using the third row address to enable repair of the third bitcell; and
 access the fourth bitcell in the fourth row slice using the fourth row address to enable repair of the third bitcell.

14. The device of claim 9, wherein:
the control circuitry is configured to use multiple row redundancy enable signals to access and repair the two different first bitcells in the first bank with the first pair of different addresses and the two different second bitcells in the second bank with the second pair of different addresses, and
the first bank of first bitcells is different from the second bank of second bitcells.

15. A method comprising:
splitting a bank of bitcells into a plurality of portions including a first row slice and a second row slice;
accessing a first bitcell in the first row slice using a first address;
accessing a second bitcell in the second row slice using a second address;
repairing the first bitcell in the first row slice using first redundancy bitcells disposed horizontally adjacent to the first row slice; and
repairing the second bitcell in the second row slice using second redundancy bitcells disposed horizontally adjacent to the second row slice.

16. The method of claim 15, wherein:
the bank of bitcells is a single bank of bitcells split into two portions including the first row slice of the bitcells and the second row slice of the bitcells.

17. The method of claim 15, wherein:
each bitcell in the first row slice is accessible via the first address, and
each bitcell in the second row slice is accessible via the second address that is different from the first address.

18. The method of claim 15, further comprising:
interfacing with control circuitry that is configured to access the first bitcell, the second bitcell, the first redundancy bitcells and the second redundancy bitcells.

19. The method of claim 15, further comprising:
interfacing with control circuitry that is configured to perform row dedicated repair by separately accessing and repairing the first bitcell in the first row slice using the first redundancy bitcells and the second bitcell in the second row slice using the second redundancy bitcells.

20. The method of claim 15, wherein:
the first address is a first dedicated row repair address for the first bitcell in the first row slice of the bank,
the second address is a second dedicated row repair address for the second bitcell in the second row slice of the bank, and
the first dedicated row repair address is different than the second dedicated row repair address.

* * * * *